Figure 1:
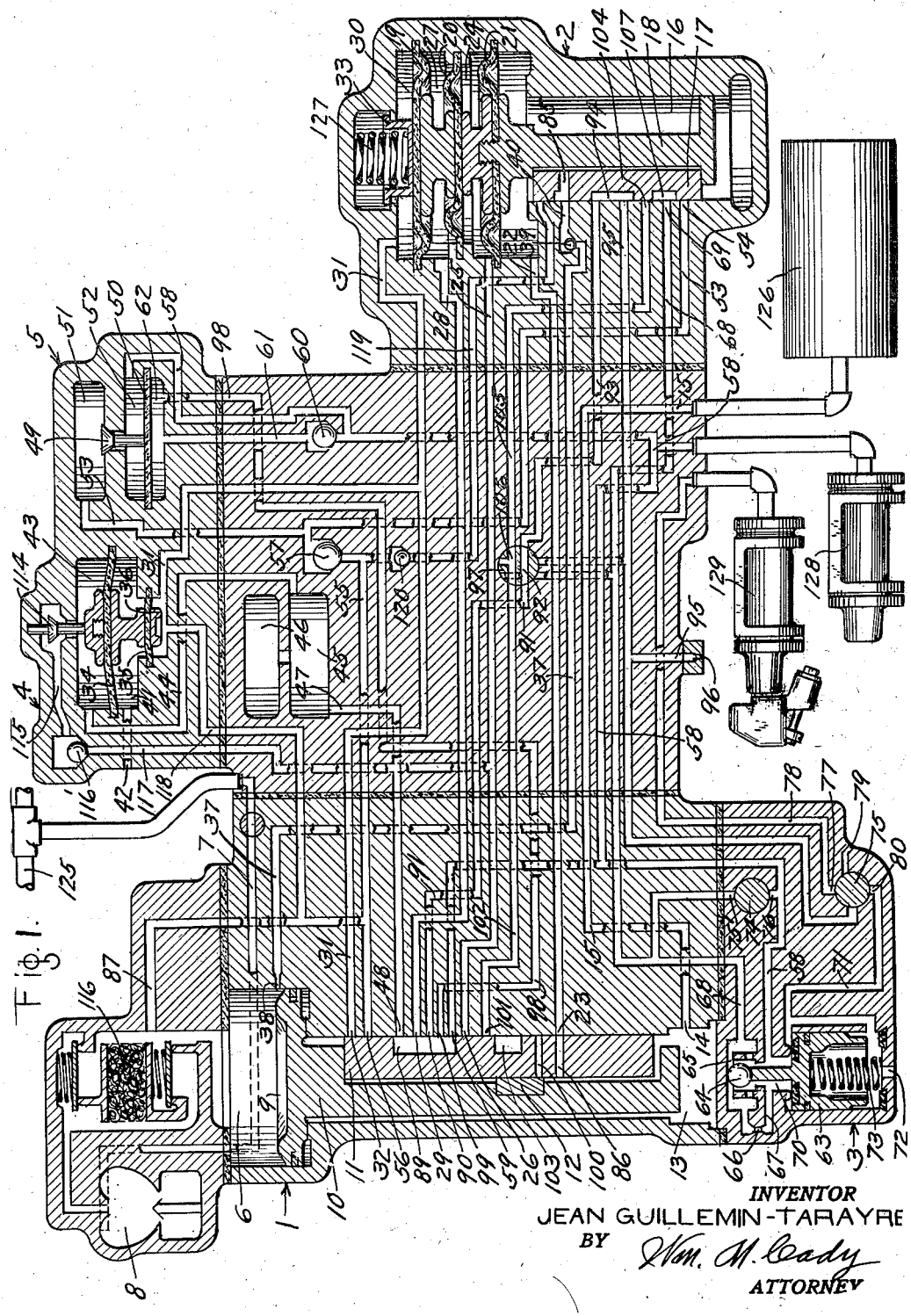

Oct. 20, 1936. J. GUILLEMIN-TARAYRE 2,058,012
FLUID PRESSURE BRAKE
Filed Nov. 23, 1933 2 Sheets-Sheet 2

INVENTOR
JEAN GUILLEMIN-TARAYRE

Patented Oct. 20, 1936

2,058,012

UNITED STATES PATENT OFFICE 2,058,012

FLUID PRESSURE BRAKE

Jean Guillemin-Tarayre, Paris, France, assignor to The Westinghouse Air Brake Company, Wilmerding, Pa., a corporation of Pennsylvania Application November 23, 1933, Serial No. 699,312
In Great Britain November 24, 1932

14 Claims. (Cl. 303—74)

This invention relates to fluid pressure braking apparatus comprising a distributing or controlling valve device adapted to effect or control an application of the brakes by the action of a substantially constant controlling pressure in opposition to the train pipe and brake cylinder pressures.

In a distributing or controlling valve device of the kind referred to the controlling pressure is usually the pressure exerted by a controlling spring or the fluid pressure obtaining in a control chamber arranged to be charged with fluid directly or indirectly from the brake pipe of the braking system and to be isolated therefrom during the periods when the brake pipe pressure is below that required in the control chamber.

In the usual arrangement in which the control chamber pressure is at least the normal running pressure of the system, it is evidently necessary that the control chamber shall be isolated from the brake pipe except when the brakes are completely released, and it is thus impossible to recharge the control chamber, in order to compensate for leakage, during the whole of the period from the beginning of an application of the brakes up to the subsequent complete release.

It is however desirable, if not essential, that the control chamber be maintained at the desired substantially constant pressure in order that the desired application corresponding to a given reduction in brake pipe pressure be obtained at all times, and various arrangements have been proposed for compensating for leakage from the control chamber. For instance a control reservoir of relatively large volume as compared with the control chamber may be associated with the latter so that the leakage of a given volume of air will have less effect on the pressure obtaining in the control chamber than it would were such reservoir not provided; it has also been proposed to provide arrangements whereby the pressure of a spring was arranged to compensate for any loss of fluid pressure in the control chamber or to replace entirely said fluid pressure should the control chamber be vented to atmosphere as the result of an accident for instance.

In view of these considerations it will be evident that the problem of providing an efficient distributing or control valve device of the kind referred to, in which the controlling pressure shall be susbtantially constant at the required value during an application of the brakes, without the necessity of providing additional arrangements such as have been described for compensating for leakage from the control chamber, involves the substitution for the control chamber pressure of some other controlling pressure or pressures and the present invention approaches the said problem from this point of view.

One object of the invention is to provide an improved distributing or control valve device of the above character in which the controlling pressures are arranged to be a function of the pressures obtaining in the brake cylinder and in the auxiliary reservoir or brake pipe at the end of a partial release operation, so that said controlling pressures may be readjusted upon each reapplication of the brakes, even subsequent to a partial release.

In accordance with a preferred form of the invention, a valve device is provided having four chambers the pressures in which are arranged to act upon abutments and cooperate so as to control the application and graduated release of the brakes, two of these chambers being arranged to be connected respectively to the brake cylinder and auxiliary reservoir under brake release conditions and isolated under brake application and brake application lap conditions so as to provide the controlling pressure for controlling an application of the brakes, and the other two chambers preferably being arranged to be connected respectively to the brake pipe and brake cylinder under application conditions and isolated under brake release conditions so as to provide the controlling pressure for controlling a graduated release of the brakes.

Another object of my invention is to provide improved means for dissipating excess pressure from the auxiliary reservoir in case the auxiliary reservoir becomes overcharged while rapidly recharging the braking system.

Other objects and advantages will be apparent from the following more detailed description of the invention.

Figure 2:
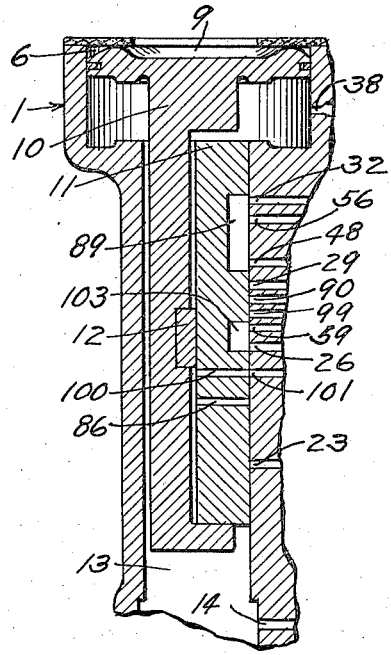
Figure 3:
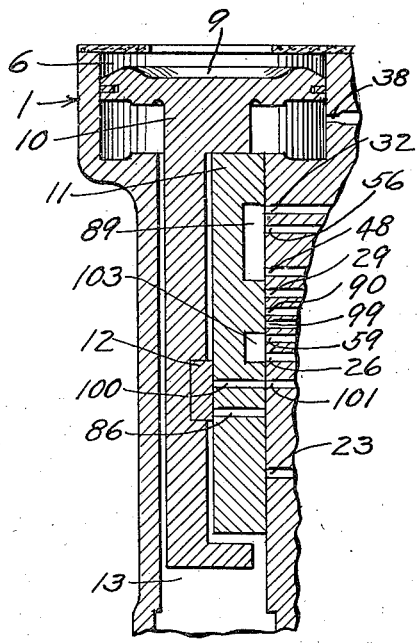
Figure 4:
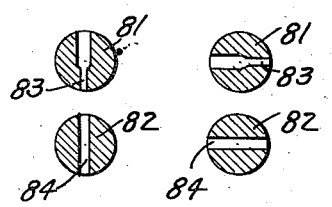

One form of braking system embodying the improvements of the invention will now be described, by way of example only, with reference to the accompanying drawings of which Figure 1 is a diagrammatic sectional view of an empty and load braking equipment embodying my invention; Figure 2 is a diagrammatic sectional view of the main controlling valve portion of the equipment shown in Figure 1 with parts shown in application position; Figure 3 is a diagrammatic sectional view similar to Figure 2 but showing the parts in their lap position; and Figure 4 is a detail view of the plug cocks forming part of the equipment of Figure 1 and illustrating the communications established thereby under different running conditions.

Referring to Figure 1, it will be seen that the braking equipment comprises a main controlling valve device 1, an auxiliary controlling valve device 2 which is adapted to effect a graduated release of the brakes and also effect or control an application of the brakes, a quick inshot valve device 3, a charging valve device 4 and a maintaining valve device 5.

The main controlling valve device 1 comprises a casing having a piston chamber 6 which is connected to the brake pipe 125 through a passage 7, dust separator 8 and air strainer 116. The piston chamber 6 contains a piston 9 having a stem 10 adapted to operate a main slide valve 11 and an auxiliary or graduating slide valve 12 contained in a valve chamber 13 which communicates with an auxiliary reservoir 126 through a port 14 and passage 15.

The auxiliary controlling valve device 2 comprises a casing having a valve chamber 16 containing a slide valve 17 operated by a stem 18 which is connected to three spaced flexible diaphragms 19, 20, 21 secured in the casing of the valve device 2, the diaphragms 19 and 21 being of substantially equal operative area and the diaphragm 20 being smaller than either the diaphragm 19 or 21. The valve chamber 16 below the diaphragm 21 communicates with a passage 22 leading to a port 23 in the seat of the main slide valve 11 of the main controlling valve device 1. A chamber 24 between the diaphragms 20 and 21 communicates with a passage 25 leading to a port 26 in the seat of the main slide valve 11. A chamber 27 between the diaphragms 19 and 20 communicates with a passage 28 leading to a port 29 in the seat of the main slide valve 11 and a chamber 30 above the diaphragm 19 communicates with a passage 31 leading to a port 32 in the seat of the main slide valve 11. A stop 33 subject to the pressure of a spring 127 is provided in the casing of the auxiliary valve device 2 and serves to limit the upward movement of the stem 18 and diaphragms 19, 20 and 21.

The charging valve device 4 comprises a casing containing a moveable valve element 36 adapted to be operated by means of differential area diaphragms 34, 35 so as to control communication between the passage 31 and chamber 30 of the auxiliary valve device 2 on the one hand and a passage 118 on the other hand. A chamber 41 between the diaphragms 34 and 35 is in communication with the atmosphere through a port 42, and a chamber 43 above the diaphragm 34 is in communication through a passage 44 with an accelerating bulb or chamber 45. The chamber 45 is in communication with a further accelerating chamber 46 and also, through a passage 47 with a port 48 in the seat of the main slide valve 11 of the main controlling valve device 1.

The maintaining valve device 5 comprises a casing containing a moveable valve element 49 adapted to be operated by means of a diaphragm 50 so as to control communication between chambers 51 and 52 in the said casing. The chamber 51 is in communication with a passage 53 leading to a port 54 in the seat of the slide valve 17 of the auxiliary valve device 2 and with a passage 55 leading to a port 56 in the seat of the main slide valve 11 of the main controlling valve device 1, a ball valve 57 being interposed between the passages 53 and 55. The chamber 52 above the diaphragm 50 is in communication with a passage 58, leading to an empty brake cylinder 128 and to a port 59 in the seat of the main slide valve 11 of the main controlling valve device 1. The passage 58 also leads past a ball valve 60 to a passage 61 and a chamber 62 below the diaphragm 50.

The quick inshot valve device 3 is of the well known construction comprising a spring controlled piston 63 adapted to operate a ball valve 64 contained in a chamber 65 which communicates through a restriction 66 and passage 67 with a chamber 70 and the passage 58. The chamber 65 also communicates with a passage 68 leading to a port 69 in the seat of the slide valve 17 of the auxiliary valve device 2. The chamber 70 is at the inner seated area of the piston 63, and at the outer seated area thereof is a chamber connected to a passage 71. The piston 63 at its lower side is subject to atmospheric pressure through a port 72, and the pressure of a spring 73.

The valve device 3 also comprises two plug cocks 74 and 75. The plug cock 74 is provided with a port 75' leading to the passage 68 and a port 76 leading to the passage 58. The plug cock 75 is provided with a port 77 communicating with a passage 78 leading to a load brake cylinder 129, an atmospheric port 79, and a port 80 communicating with the passage 71.

The plug cocks 74 and 75 are provided with rotary plug members 81 and 82 respectively (Figure 4), the plug member 81 being provided with a restricted passage 83, and the plug member 82 with a passage 84.

The operation of the braking equipment is as follows:

In initially charging the braking system fluid under pressure from the train pipe 125 flows through the passage 7, dust separator 8 and air strainer 116 to the piston chamber 6. From the piston chamber 6 fluid under pressure flows through a port 38, a passage 37, past a ball valve 39, and through port 40 and a port 85 in the slide valve 17 to the valve chamber 16. From the valve chamber 16 fluid under pressure flows through passage 22, port 23, and a port 86 in the main slide valve 11 to valve chamber 13 and thence through port 14 and passage 15 to the auxiliary reservoir 126.

Fluid under pressure from the piston chamber 6 also flows through a passage 87, passage 55 and past the ball valve 57, to the chamber 51 of the maintaining valve device 5 through the passage 53 on the one hand, and to the port 54 in the seat of the slide valve 17 through the passage 53 on the other hand.

From the passage 87 fluid also flows to the chamber 30 of the auxiliary valve device through passage 118 past the valve element 36 of the charging valve device 4 and through the passage 31, the valve element 36 being unseated by the pressure in the passage 118 as the chamber 43 above the diaphragm 34 is connected through passage 44 to the accelerating chambers 45 and 46 which under release conditions, as shown in Fig. 1 of the drawings, are connected to a brake cylinder release atmospheric port 96 through passage 47, port 48, a recess 89 in the main slide valve 11, a port 90 in the seat of said slide valve, a passage 91, a passage 92 in a plug cock 97, a passage 93, a recess 94 in the slide valve 17 and a passage 95.

Assuming that the equipment is adjusted for load braking, that is to say that the plug members 81, 82 occupy the positions shown on the left of Fig. 4, the empty brake cylinder 128 will be in communication with the atmosphere by way of passage 58, port 59, recess 89 in the main slide valve 11, port 90, passage 91, passage 92 in plug cock 97, passage 93, recess 94 in slide valve 17, passage 95 and atmospheric port 96. The load brake cylinder 129 is in communication with the atmosphere through passage 78, port 77, passage 84 in the plug member 82 of the plug cock 75, port 80, passage 71 and atmospheric port 72.

The chambers 52 and 62 in the maintaining valve device 5 both contain fluid at atmospheric pressure and the valve 49 is held closed by fluid at brake pipe pressure in the chamber 51; the chamber 52 is connected to the recess 89 in the main slide valve 11 through passage 58 and port 59 and the chamber 62 is connected to the recess 89 through a passage 98 and a port 99, the recess 89 being in communication with the atmospheric port 96 through the port 90, passages 91, 92 and 93, recess 94 and passage 95.

Fluid at brake pipe pressure is supplied through the charging valve device 4 to the chamber 30 of the auxiliary valve device 2 when initially charging the system as explained above, in order to prevent the fluid at brake pipe pressure, supplied to the auxiliary reservoir 126 through the chamber 16 of the auxiliary valve device, from raising the diaphragm 21, on which it acts, and thus cutting off the supply of fluid to the auxiliary reservoir 126 by causing the slide valve 17 to blank the port 40.

When the system is fully charged with fluid to the normal or standard pressure, the various parts of the apparatus are in their release positions, as shown in Figure 1, and under these conditions the fluid pressures obtaining in the chambers of the auxiliary valve device 2 are as follows:

Chamber 30 contains fluid at the normal or standard brake pipe pressure, and the chamber 16 contains fluid at auxiliary reservoir pressure. The chamber 27 contains fluid at atmospheric pressure as this chamber is connected to the brake cylinder or cylinders, and the chamber 24 is isolated, the port 26 leading to the passage 25 being blanked by the main slide valve 11.

In order to effect an application of the brakes, the train pipe pressure is reduced in the usual manner and the piston 9 of the main controlling valve device 2 moves to its service application position shown in Figure 2.

At the beginning of this movement the port 38 is passed over by the piston 9 and the graduating slide valve 12 uncovers a port 100 in the main slide valve 11. Subsequent movement of the piston moves the main slide valve 11 to its service application position in which the port 100 comes into communication with a port 101 leading to a passage 102, a recess 103 in the slide valve 11 connects ports 26 and 59, the ports 99, 90 and 29 are blanked, and the recess 89 in the slide valve 11 connects the ports 48, 56 and 32 (Figure 2).

Fluid then flows from the brake pipe through passage 7, dust separator 8, air strainer 116, passage 87, passage 55, port 56, recess 89, port 48 and passage 47 to the accelerating chambers 45 and 46, and flows thence through passage 44 to chamber 43 of the charging valve device 4 where, acting on the diaphragm 34, it holds the valve 36 seated.

The fluid pressure obtaining in the chamber 30 of the auxiliary valve device reduces to the same value as the reduced brake pipe pressure by flow from the chamber 30 through the passage 31, port 32, recess 89, port 48 and passage 47 to the accelerating chambers 45 and 46. The diaphragms 19, 20 and 21 together with the slide valve 17 of the auxiliary valve device 2 are now moved upwardly under the action of the initial auxiliary reservoir pressure acting on the diaphragm 21 in the chamber 16, which chamber is now isolated from the auxiliary reservoir 126 as regards flow from the chamber 16, since the port 23 in the main slide valve seat is blanked by the main slide valve 11, and the ball valve 39 prevents flow through the passage 37 and port 38 to the auxiliary reservoir by way of the main valve chamber 13 and passage 15.

In this upper position, the slide valve 17 blanks the port 40, breaks communication between the passages 93 and 95 through the recess 94, and establishes communication through a recess 107 between the port 69 and a port 104 in communication with a passage 105 leading, through a passage 106 in the plug cock 97 to the passage 102.

Fluid now flows from the auxiliary reservoir 126 through the passage 15, valve chamber 13, port 100 in the main slide valve 11, port 101, passage 102, passage 106 in plug cock 97, passage 105, port 104, recess 107 in the slide valve 17, port 69, passage 68, past the unseated ball inshot valve 64, and passage 58 to the empty brake cylinder 128. As soon as a predetermined pressure has been obtained in the empty brake cylinder 128 the piston 63 of the quick inshot valve is moved downwardly and fluid is supplied from the passage 58 to the load brake cylinder 129 through the passage 71, port 80, passage 84 in the plug member 82 of the plug cock 75, port 77 and passage 78; with the piston 63 in its lower position and the ball valve 64 therefore seated, fluid is supplied from the passage 68 to the passage 58 through the restricted port 66 and also through the restricted port 83 in the plug member 81 of the plug cock 74.

The chamber 30 of the auxiliary valve device 2 under the application conditions, above described, contains fluid at reduced brake pipe pressure, the chamber 27, which was under release conditions connected to brake cylinder, i. e. atmosphere, is now isolated, the chamber 24 is connected to brake cylinder through passage 25, port 26, recess 103 in slide valve 11, port 59 and passage 58, and the chamber 16 contains fluid at initial or normal auxiliary reservoir pressure.

When the brake cylinder pressure acting in the chamber 24 attains a predetermined value, dependent upon the pressures obtaining in the chambers 30, 27 and 16, it will cause the diaphragms 19, 20 and 21 and slide valve 17 to move downwardly to a lap position in which communication between the ports 104 and 69 is closed, thereby preventing further flow of fluid under pressure to the brake cylinders.

Under brake application conditions the chambers 52 and 62 of the maintaining valve device 5 contain fluid at brake cylinder pressure Should the brake cylinder pressure fall, while the brakes are applied, owing for instance to leakage, then the fluid pressure in chamber 52 of the maintaining valve device will fall correspondingly by flow through the passage 58, while the fluid pressure obtaining in the chamber 62 is maintained owing to the provision of the ball valve 60 in the passage 61. Consequently the diaphragm 50 is raised and unseats the valve 49 with the result that fluid is supplied from the brake pipe 125 through the passage 7, dust separator 8, air strainer 116, passage 87, passage 55, past the check valve 57, passage 53, chamber 51, past the valve 49, and passage 58, to the brake cylinders 128 and 129 until the brake cylinder pressure attains its previous value as determined by the fluid pressure obtaining in the chamber 62 of the maintaining valve device, whereupon the valve 49 becomes seated again.

In order partially to release the brakes, the train pipe pressure is raised in the usual manner and moves the piston 9 of the main controlling valve device 1 to its release position, thus moving the main and graduating slide valves 11 and 12 to their release positions, as shown in Figure 1.

The port 32 in the seat of the main slide valve 11 is now blanked and, the valve element 36 being held seated by the fluid pressure obtaining in the accelerating chambers 45 and 46, the chamber 30 of the auxiliary valve device is isolated and contains fluid at a pressure corresponding to the previously reduced train pipe pressure. (The valve element 36 will not be unseated until the brakes are almost completely released and the accelerating chambers 45 and 46 vented almost completely to atmosphere.)

The chamber 27 of the auxiliary valve device is connected to the brake cylinders through the passage 28, port 29 and recess 89 in the slide valve 11. The chamber 24 is isolated and contains fluid at a pressure corresponding to the brake cylinder pressure obtained during the previous application, and the chamber 16 is connected to the auxiliary reservoir 126 through the passage 22 and ports 23 and 86. Fluid is supplied from the brake pipe to the chamber 16 through the port 38, passage 37 and ports 40 and 85 and thence to the auxiliary reservoir through the passage 22 and ports 23 and 86, and fluid is vented from the brake cylinders through the recess 94 in the slide valve 17 and the recess 89 in the slide valve 11. Should the auxiliary reservoir be recharged too rapidly as compared with the release of fluid from the brake cylinder or cylinders, the silde valve 17 will be moved upwardly so as to restrict or cut off the supply of fluid to the auxiliary reservoir through the port 85 while still permitting the release of fluid from the brake cylinders and chamber 27 through the recess 94. On the other hand, should the auxiliary reservoir be recharged too slowly as compared with the release of fluid from the brake cylinders, then the slide valve 17 will be moved downwardly so as to cut off or restrict the release of fluid from the brake cylinders through the recess 94 while still maintaining communication between the train pipe and the auxiliary reservoir through the ports 40 and 85.

As soon as the auxiliary reservoir pressure obtaining in the chamber 16 and the brake cylinder pressure obtaining in the chamber 27 acting on the differential area diaphragms correspond to the pressures obtaining in the solated chambers 30 and 24, the valve 17 will assume its lap position again and the brakes will be held applied at the reduced brake cylinder pressure.

Under these conditions, should fluid leak from the brake cylinders, the pressure obtaining in the chamber 27 will fall and the slide valve 17 will be moved downwardly and connect the ports 69 and 54 through the recess 107 whereupon fluid will be supplied to the brake cylinders from the brake pipe through the passages 87, 55 and 53, port 54, recess 107, port 69 and passage 68.

Under application conditions the valve 114 is seated as is also the valve 36 and flow of fluid from chamber 24 through the passages 117 and 115 is thus prevented; the ball valve 116' prevents flow of fluid from the accelerating chamber 45 through the passages 115, 117 and 25 to the chamber 24 at the commencement of an application of the brakes and thus allows the valves 114 and 36 to be seated by accelerating chamber pressure acting on the diaphragm 34. When the brakes are almost completely released, however, and the accelerating chambers 45 and 46 vented almost completely to atmosphere, fluid at brake cylinder pressure contained in the chamber 24 is permitted to escape to atmosphere by way of passage 25, a passage 117, past the ball valve 116', through a passage 115, past a valve 114 adapted to be operated by the diaphragms 34 and 35, and through passage 44, so that the slide valve 17 will not be moved downwards when the brakes are fully released, so as to connect the ports 54 and 69, by the fluid pressure in the chamber 24 acting on the diaphragm 21.

If it be now desired to reapply the brakes after a partial release, the brake pipe pressure is reduced again in the usual manner and the main and graduating slide valves 11 and 12 of the main controlling valve device are consequently moved again to their application positions, as shown in Fig. 2.

Under these conditions the supply of fluid to the brake cylinder is controlled, by the slide valve 17 of the auxiliary valve device in accordance with the pressures obtaining in the chambers 30, 27, 24 and 16. Under reapplication conditions the chamber 30 is connected to accelerating chambers 45 and 46 and contains fluid at the reduced train pipe pressure. The chamber 27 is isolated from the brake cylinders and contains fluid at the brake cylinder pressure obtained during the previous partial release of the brakes. The chamber 24 is connected to the brake cylinders and the chamber 16 is isolated from the auxiliary reservoir and contains fluid at the pressure obtained in the auxiliary reservoir during the previous partial release of the brakes.

It will be evident that the action of the auxiliary valve device 2 associated with the main valve device 1 in effecting a partial or graduated release of the brakes is similar to that of the graduated release valves having controlling springs or constant pressure control chambers such as have already been referred to hereinbefore, the controlling pressure in the improved valve device of the present invention being however what may be termed a composite pressure having two components i. e. the pressure obtaining in the chamber 24 and the pressure obtaining in the chamber 30 of the auxiliary valve device. These components vary in value in accordance with the degree of application of the brakes prior to a graduated release but the operative areas of the diaphragms may be calculated so that the composite controlling pressure shall be substantially constant.

Upon effecting an application of the brakes after a complete release, the chamber 16 of the auxiliary valve device contains fluid at full auxiliary reservoir pressure while the chamber 27 contains fluid at atmospheric pressure although upon a reapplication of the brakes after a partial release the chamber 16 will contain fluid at a pressure corresponding to the reduced pressure obtaining in the auxiliary reservoir immediately prior to the reapplication of the brakes and the chamber 27 will contain fluid at a pressure corresponding to the fluid pressure remaining in the brake cylinder at the end of the partial release.

Under application conditions the controlling pressure is constituted by the pressures obtaining in the chambers 16 and 27 of the auxiliary valve device 2 and it will be evident that owing to the chambers 24 and 30 being connected respectively to the brake cylinder and brake pipe during an application of the brakes, the brake cylinder pressure obtained will be a function of the train pipe pressure independently of the brake cylinder piston travel.

Owing to the relatively small differences of pressure occurring during normal operation between opposite sides of the diaphragms, the controlling pressure having been divided into two component parts, the diaphragms may operate without substantial loss of efficiency in case of leakage from one side of a diaphragm to the other side.

When the brakes are rapidly and completely released by supplying fluid rapidly to the brake pipe 125, the pressure obtaining in the chamber 43 will fall to atmospheric pressure and the valve 36 will therefore be raised from its seat by brake pipe pressure obtained through passage 118, thus permitting brake pipe pressure to be established in the passage 31 and in the chamber 30 of the valve device 2. Chambers 27 and 24 are vented to atmosphere as hereinbefore explained, so that the pressures acting on the pile of diaphragms of the valve device 2 are: brake pipe pressure in the chamber 30 and the auxiliary reservoir pressure in the chamber 16, this chamber being supplied with fluid from the brake pipe through the port 38, passage 37 and ports 40 and 85.

In the event of the brake pipe and auxiliary reservoir being overcharged and the brake pipe pressure subsequently falling to its normal or standard value, the pile of diaphragms of the valve device 2 will rise and the passage 119 will be connected by port 85 to the chamber 16 (and ports 40 and 85 disconnected) so that excess fluid in the auxiliary reservoir 126 and chamber 16, as well as valve chamber 13, will flow to the brake pipe through the passage 119 past the check valve 120. The check valve 120 prevents the flow of fluid in the opposite direction.

When it is desired to render the load cylinder inoperative, as in the case of an empty or lightly loaded vehicle, the plug members 81, 82 of the plug cocks 74, 75 are adjusted to the position shown on the right of Figure 4. In this position the supply of fluid to the passage 58 through the passage 83 in the plug member 81 is cut off, while the supply of fluid through the passage 84 in the plug member 82 to the passage 78 leading to the load brake cylinder is interrupted.

In order to permit the auxiliary valve device 2 to be cut out of action and the main controlling valve device 1 to function to effect an application and release of the brakes in the usual way the cock 97 is provided. As shown in the drawings, the port 106 in the cock 97 connects the brake cylinder supply passage 102 to the passage 105 and port 104 in the seat of the auxiliary valve device 2, and the port 92 in the cock 97 connects the brake cylinder exhaust passage 91 to the passage 93, the auxiliary valve device 2 being thus operative. If, however, the cock 97 is turned through 90° in an anti-clockwise direction the port 106 in the cock connects the passage 102 directly to the passage 68 and the port 92 in the cock connects the passage 91 directly to the passage 95, thus cutting out the auxiliary valve device 2 and permitting the supply to and release of fluid from the brake cylinder or cylinders to be controlled solely by the main controlling valve device 1.

It will be evident that the invention is not limited to the particular construction and arrangement of the parts hereinbefore described which may be varied as desired to suit particular requirements without exceeding the scope of the invention.

Having now described my invention, what I claim as new and desire to secure by Letters Patent, is:

1. In a fluid pressure brake, the combination with a brake pipe, an auxiliary reservoir, and a brake cylinder, of valve means controlled by variations in brake pipe pressure for supplying fluid under pressure from said auxiliary reservoir to said brake cylinder to effect an application of the brakes and for releasing fluid under pressure from said brake cylinder for effecting a release of the brakes, a valve device for controlling the release of fluid under pressure from said brake cylinder by the operation of said valve means and operative in case of leakage of fluid under pressure from said brake cylinder to maintain the pressure in said brake cylinder proportional to the amount brake pipe pressure is reduced below that normally carried, and pressure means adjusted while effecting an application of the brakes and locked in the adjusted condition upon initiating a release of the brakes for controlling the operation of said valve device.

2. In a fluid pressure brake, the combination with a brake pipe, an auxiliary reservoir, and a brake cylinder, of valve means controlled by variations in brake pipe pressure for supplying fluid under pressure from said auxiliary reservoir to said brake cylinder to effect an application of the brakes and for releasing fluid under pressure from said brake cylinder for effecting a release of the brakes, and pressure means adjusted while effecting a release of the brakes and locked in the adjusted condition upon initiating an application of the brakes, by the operation of said valve means, for regulating the pressure obtained in said brake cylinder in accordance with the degree of reduction in brake pipe pressure.

3. In a fluid pressure brake, the combination with a brake pipe, an auxiliary reservoir, and a brake cylinder, of valve means controlled by variations in brake pipe pressure for supplying fluid under pressure from said auxiliary reservoir to said brake cylinder to effect an application of the brakes and for releasing fluid under pressure from said brake cylinder for effecting a release of the brakes, and means subject to control fluid pressures equal to those in said auxiliary reservoir and brake cylinder at the time an application of the brakes is initiated for regulating the pressure obtained in said brake cylinder, during said application, in accordance with the degree of reduction in pressure in said brake pipe and means for bottling said control pressures upon reducing the pressure of fluid in said brake pipe.

4. In a fluid pressure brake, the combination with a brake pipe, an auxiliary reservoir, and a brake cylinder, of valve means controlled by variations in brake pipe pressure for supplying fluid under pressure from said auxiliary reservoir to said brake cylinder to effect an application of the brakes and for releasing fluid under pressure from said brake cylinder for effecting a release of the brakes, and means controlled, in effecting an application of the brakes, by reducing brake pipe pressure, increasing brake cylinder pressure, and constant pressures equal to those in the brake cylinder and brake pipe at the time a reduction in brake pipe pressure is initiated, for regulating the pressure in said brake cylinder in accordance with the degree of reduction in brake pipe pressure.

5. In a fluid pressure brake, the combination with a brake pipe, an auxiliary reservoir, and a brake cylinder, of valve means controlled by variations in brake pipe pressure for supplying fluid under pressure from said auxiliary reservoir to said brake cylinder to effect an application of the brakes and for releasing fluid under pressure from said brake cylinder for effecting a release of the brakes, and means controlled, in effecting a release of the brakes, by increasing auxiliary reservoir pressure, reducing brake cylinder pressure and pressures equal to those in the brake cylinder and brake pipe at the time an increase in brake pipe pressure is initiated for regulating the pressure in said brake cylinder in accordance with the acting pressure in said brake pipe as related to the pressure normally carried in said brake pipe.

6. In a fluid pressure brake, the combination with a brake pipe, an auxiliary reservoir, and a brake cylinder, of valve means controlled by variations in brake pipe pressure for supplying fluid under pressure from said auxiliary reservoir to said brake cylinder to effect an application of the brakes and for releasing fluid under pressure from said brake cylinder for effecting a release of the brakes, and means for regulating the pressure in said brake cylinder in accordance with the degree of pressure acting in said brake pipe with respect to that normally carried in said brake pipe, said means comprising a valve device for controlling communications through which fluid under pressure is supplied to and released from said brake cylinder by the operation of said valve means, and a plurality of movable abutments for controlling the operation of said valve device and controlled in applying the brakes by the reducing brake pipe pressure, by the increasing brake cylinder pressure, and by pressures equal to those in the auxiliary reservoir and brake cylinder at the time the brake application is initiated, said abutments being controlled in effecting a release of the brakes after an application by the increasing auxiliary reservoir pressure, by the reducing brake cylinder pressure, and by pressures equal to those in the brake pipe and auxiliary reservoir at the time a release of the brakes is initiated.

7. In a fluid pressure brake, the combination with a brake pipe, an auxiliary reservoir, and a brake cylinder, of valve means controlled by variations in brake pipe pressure for supplying fluid under pressure from said auxiliary reservoir to said brake cylinder to effect an application of the brakes and for releasing fluid under pressure from said brake cylinder for effecting a release of the brakes, a valve device for controlling said release of fluid under pressure from said brake cylinder, and means controlled by constant pressures equal to those in the brake pipe and brake cylinder at the time a release of brakes is initiated controlling the operation of said valve device to release fluid under pressure from said brake cylinder; according to the increase in auxiliary reservoir pressure.

8. In a fluid pressure brake, the combination with a brake pipe, an auxiliary reservoir, and a brake cylinder, of valve means controlled by variations in brake pipe pressure for supplying fluid under pressure from said auxiliary reservoir to said brake cylinder to effect an application of the brakes and for releasing fluid under pressure from said brake cylinder for effecting a release of the brakes, a valve device for controlling the supply and release of fluid under pressure to and from said brake cylinder by the operation of said valve means and operative in effecting a release of the brakes in case of leakage of fluid under pressure from said brake cylinder to supply fluid under pressure to said brake cylinder independently of said valve means for maintaining brake cylinder pressure proportional to the amount brake pipe pressure is reduced below that normally carried, and means controlled by the pressures of fluid acting in the auxiliary reservoir and brake cylinder at the time an application of the brakes is initiated and by the pressures of fluid in said brake pipe and brake cylinder at the time a release of the brakes is initiated for controlling the operation of said valve device.

9. The combination with a brake pipe, an auxiliary reservoir and a brake cylinder, of a valve device for regulating the pressure in said brake cylinder in accordance with the degree of reduction in brake pipe pressure below that normally carried, a plurality of movable abutments for controlling the operation of said valve device and forming four control chambers, two of which are connected to said brake pipe and brake cylinder respectively in effecting a release of the brakes and isolated in effecting an application of the brakes, the other two chambers being connected to the brake cylinder and auxiliary reservoir respectively in effecting an application of the brakes and isolated in effecting a release of the brakes, and valve means responsive to variations in brake pipe pressure for controlling the connections to said chambers.

10. In a fluid pressure brake, the combination with a brake pipe, a brake cylinder, and an auxiliary reservoir, of valve means movable upon a reduction in brake pipe pressure to an application position to supply fluid under pressure from said auxiliary reservoir to said brake cylinder and movable upon an increase in brake pipe pressure to a release position to vent fluid under pressure from said brake cylinder, and a valve device for controlling the supply and release of fluid under pressure to and from said brake cylinder by the operation of said valve means and operative to proportion the brake cylinder pressure to the degree of reduction in brake pipe pressure, said valve device comprising a plurality of movable control abutments forming four chambers, two of which are connected to the brake cylinder and auxiliary reservoir respectively in release position of said valve means and bottled upon movement of said valve means to application position, while the other two of said chambers are connected to the brake pipe and brake cylinder respectively in application position of said valve means and bottled in release position of said valve means, and means coacting with said valve means to bottle the two last mentioned chambers in the release position of said valve means, when the brake cylinder pressure exceeds a low degree and operative when the brake cylinder pressure reduces below said low degree to vent the last mentioned brake cylinder chamber and to connect the other of said two last mentioned chambers to the brake pipe.

11. In a fluid pressure brake, the combination with a brake pipe, an auxiliary reservoir, and a brake cylinder, of a valve device movable upon a reduction in brake pipe pressure from a release position to an application position to supply fluid under pressure from said auxiliary reservoir to said brake cylinder to effect an application of the brakes and movable to a lap position to cut off the supply of fluid under pressure to said brake cylinder when the auxiliary reservoir pressure is reduced to substantially the same degree as brake pipe pressure is reduced, and movable upon an increase in brake pipe pressure to release position to vent fluid under pressure from said brake cylinder to effect a release of brakes, valve means conditioned when said valve device is out of release position to maintain brake cylinder pressure, against leakage, proportional to the reduction in brake pipe pressure, and other valve means operative when said valve device is in release position to control the release of fluid under pressure from said brake cylinder and operative in case of leakage of fluid under pressure from said brake cylinder to supply fluid under pressure to said brake cylinder to maintain brake cylinder pressure proportional to the amount brake pipe pressure is reduced below that normally carried.

12. In a fluid pressure brake, the combination with a brake pipe, an auxiliary reservoir, and a brake cylinder, of a valve device operative upon a reduction in brake pipe pressure to supply fluid under pressure from said auxiliary reservoir to said brake cylinder to effect an application of the brakes, and operative upon an increase in brake pipe pressure to release fluid under pressure from said brake cylinder, and valve means controlled by said valve device and the pressures acting in the brake cylinder and auxiliary reservoir at the initiation of an application of brakes and by the pressures in the brake cylinder and brake pipe at the initiation of a release of brakes for maintaining the pressure in the brake cylinder proportional to the degree of reduction in brake pipe pressure below the brake pipe pressure normally carried.

13. In a fluid pressure brake, the combination with a brake pipe, an auxiliary reservoir, and a brake cylinder, of a triple valve device movable according to variations in brake pipe pressure to a release position, an application position, and a lap position for releasing fluid under pressure from said brake cylinder, for supplying fluid under pressure from said auxiliary reservoir to said brake cylinder and for lapping said brake cylinder, respectively, a valve for controlling the supply and release of fluid under pressure to and from said brake cylinder by the operation of said triple valve device and having a position for supplying fluid under pressure to said brake cylinder independently of the operation of said triple valve device, a plurality of movable connected abutments operatively connected to said valve for positioning said valve, said abutments forming one chamber adapted to be connected to said auxiliary reservoir when said triple valve device is in release position and bottled up when said triple valve device is moved out of release position, and forming another chamber adapted to be connected to the brake cylinder when said triple valve device is in application position and bottled up when said triple valve device is in release position, and forming a third chamber connected to the brake cylinder when said triple valve device is in release position and bottled up when said triple valve device is in application position, and forming a fourth chamber connected to said brake pipe when said triple valve device is in application position, this latter connection being closed when said triple valve device is in release position, a communication connecting said fourth chamber to the brake pipe independently of said triple valve device, a control valve for controlling said communication and operated in effecting an application of the brakes to close said communication and controlled by fluid at brake cylinder pressure in effecting a release of the brakes and operative when the brake cylinder pressure is reduced to a low degree to open said communication, and a release valve operated, upon the operation of said control valve to open said communication, to open a communication through which the second mentioned chamber is adapted to be vented.

14. In a fluid pressure brake, the combination with a brake pipe, an auxiliary reservoir and a brake cylinder, of a triple valve device operated upon a reduction in brake pipe pressure to supply fluid under pressure from said auxiliary reservoir to said brake cylinder, and operated upon an increase in brake pipe pressure to release fluid under pressure from said brake cylinder, and valve means controlled by fluid under pressure from the brake pipe, auxiliary reservoir and brake cylinder for controlling the supply and release of fluid under pressure to and from said brake cylinder by the operation of said triple valve device and for controlling the supply of fluid under pressure to said auxiliary reservoir when said triple valve device is operated upon an increase in brake pipe pressure, said valve means being operative in case said auxiliary reservoir becomes overcharged to a pressure in excess of that normally carried in said brake pipe to establish a communication through which fluid under pressure is adapted to flow from said auxiliary reservoir to said brake pipe upon a subsequent reduction in brake pipe pressure to that normally carried.

JEAN GUILLEMIN-TARAYRE.